(12) United States Patent
Wadsworth

(10) Patent No.: US 11,305,497 B2
(45) Date of Patent: *Apr. 19, 2022

(54) AUTOMATED FIBER PLACEMENT AND IN-SITU FIBER IMPREGNATION SYSTEM AND METHOD

(71) Applicant: SPIRIT AEROSYSTEMS, INC., Wichita, KS (US)

(72) Inventor: Mark A. Wadsworth, Sedan, KS (US)

(73) Assignee: SPIRIT AEROSYSTEMS, INC., Wichita, KS (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/998,584

(22) Filed: Aug. 20, 2020

(65) Prior Publication Data

US 2020/0376781 A1 Dec. 3, 2020

Related U.S. Application Data

(63) Continuation-in-part of application No. 16/013,461, filed on Jun. 20, 2018, now Pat. No. 10,751,954.

(51) Int. Cl.
```
B29C 65/08      (2006.01)
B29C 70/34      (2006.01)
B29C 70/38      (2006.01)
B29C 70/42      (2006.01)
B29C 70/54      (2006.01)
B29C 65/00      (2006.01)
```

(52) U.S. Cl.
CPC .......... *B29C 70/384* (2013.01); *B29C 65/085* (2013.01); *B29C 66/81451* (2013.01); *B29C 66/81469* (2013.01); *B29C 66/836* (2013.01); *B29C 70/34* (2013.01); *B29C 70/42* (2013.01); *B29C 70/543* (2013.01); *B29C 70/546* (2013.01)

(58) Field of Classification Search
CPC ..... B29C 65/08; B29C 65/083; B29C 65/085; B29C 65/086; B29C 66/81451; B29C 66/81463; B29C 66/81469; B29C 66/834; B29C 66/8341; B29C 66/83411; B29C 66/83417; B29C 66/83421; B29C 66/836; B29C 66/8362; B29C 70/34; B29C 70/38; B29C 70/382; B29C 70/384; B29C 70/386; B29C 70/388; B29C 70/40; B29C 70/42; B29C 70/543; B29C 70/545; B29C 70/546

See application file for complete search history.

(56) References Cited

U.S. PATENT DOCUMENTS

| | | | | |
|---|---|---|---|---|
| 3,574,040 A | * | 4/1971 | Chitwood | B29C 70/386 |
| | | | | 156/522 |
| 4,992,133 A | * | 2/1991 | Border | B29C 65/18 |
| | | | | 156/498 |

(Continued)

*Primary Examiner* — Michael A Tolin
(74) *Attorney, Agent, or Firm* — Hovey Williams LLP

(57) ABSTRACT

An automated fiber placement (AFP) and in-situ fiber impregnation system includes a feeder, a resin dispenser, and a compaction roller. The feeder feeds a tow of fiber from a fiber supply toward a forming tool. The resin dispenser deposits resin onto the forming tool in front of the compaction roller. The compaction roller moves over the tow along the forming tool so as to press the tow onto the resin such that the compaction roller impregnates the resin into the tow a direction away from the forming tool via compaction forces immediately after the resin is deposited by the resin dispenser.

26 Claims, 6 Drawing Sheets

(56) References Cited

U.S. PATENT DOCUMENTS 10,751,954 B2* 8/2020 Wadsworth ............. B29C 66/95
2003/0056894 A1* 3/2003 Getz ................... B29C 66/1122
156/307.7

* cited by examiner

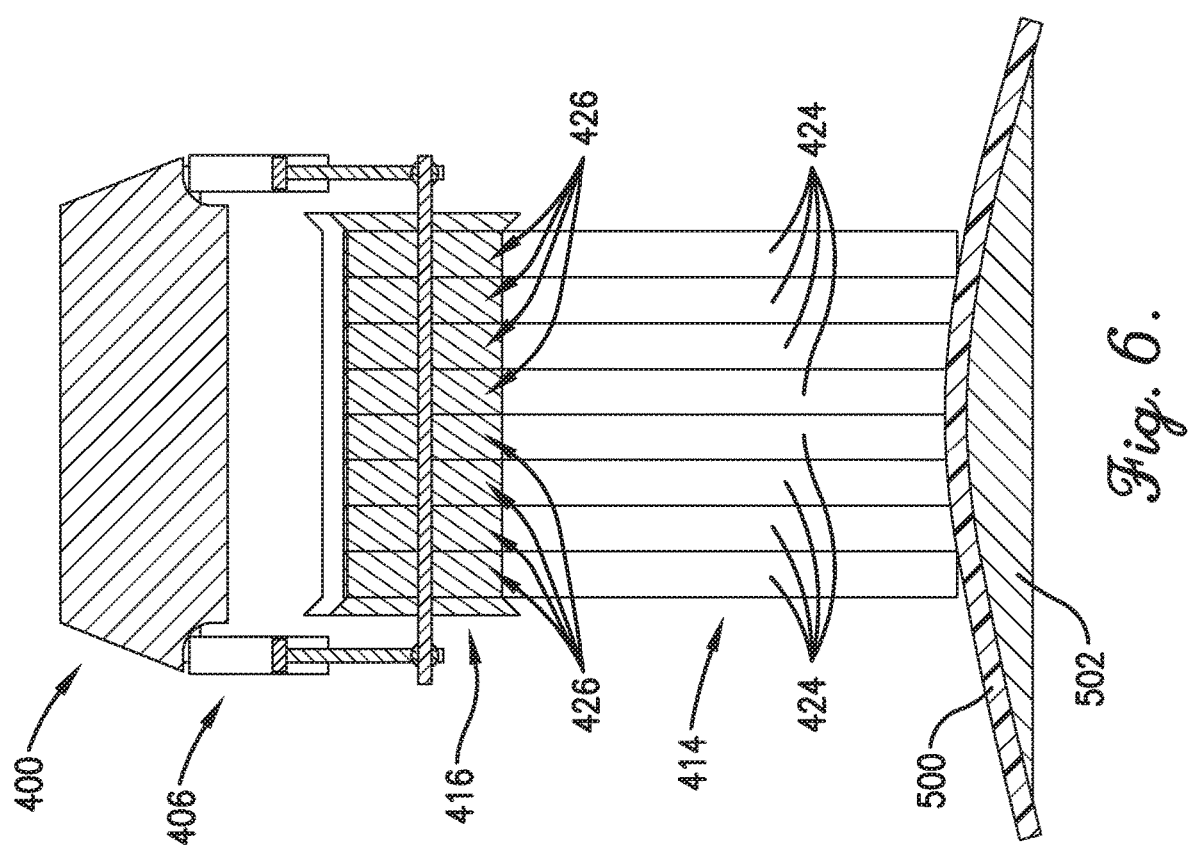

AUTOMATED FIBER PLACEMENT AND IN-SITU FIBER IMPREGNATION SYSTEM AND METHOD

This regular utility non-provisional patent application is a continuation-in-part (CIP) and claims priority benefit with regard to all common subject matter of earlier-filed non-provisional U.S. patent application Ser. No. 16/013,461, filed on Jun. 20, 2018, now U.S. Pat. No. 10,751,954, and entitled "AUTOMATED FIBER PLACEMENT AND IN-SITU FIBER IMPREGNATION SYSTEM AND METHOD". The identified earlier-filed patent application is hereby incorporated by reference in its entirety into the present application.

BACKGROUND

Automated fiber placement (AFP) is often used to construct composite components due to the superior mechanical properties obtained from improved fiber orientation control and fiber architecture compared to laying up fiber by hand. However, AFP has high ancillary costs related to preparing feedstock material to be compatible with AFP machinery. For example, AFP requires several value-added steps such as pre-impregnation, B-staging, refrigerated storing and shipping, slitting, and respooling. The material and preparation costs are a significant portion of the total cost of fabricating a composite component via AFP. Furthermore, these preparations are not always performed by the same organization or at the same location, resulting in additional shipping costs and diminished shelf life and out-life.

Composite parts also suffer from a number of defects whether they are formed via AFP or by hand. For example, laminate porosity is a common defect in which air is trapped between plies of pre-impregnated material. Substantial pressure must be applied to the laminate in order to compress or discharge the air to the laminate's edge.

Pre-impregnated materials also have a very high surface area to mass ratio, and any atmospheric contact inherent to handling, shipping, slitting, thawing, and layup provides opportunity for the resin to absorb moisture from the air. This moisture can boil during elevated temperature cures, thereby forming porosity in the composite part.

Solvent is often used to aid in pre-impregnation processes and is frequently not completely removed before layup. Residual solvent can boil during laminating or curing, thereby forming voids in the composite part.

AFP systems often include compaction rollers to compress layers of fiber as the layers are laid up. The compaction rollers are completely rigid cylinders, which results in uneven compaction over curved forming tools. Complete rigidity also makes compaction rollers poor transmitters of compressive vibrations from vibration sources to the layers of fiber.

SUMMARY

Embodiments of the invention solve at least some of the above-mentioned problems and provide a distinct advance in automated fiber placement (AFP). More particularly, the invention provides an AFP and in-situ impregnation system that eliminates or reduces preparation and more effectively places and impregnates a fiber tow on a forming tool.

An embodiment of the AFP and in-situ impregnation system broadly comprises a feeder, a tow spreader, a resin dispenser, a surface heater, a compaction roller, an intermediate heater, and a transfer roller.

The feeder includes opposing traction feed rollers configured to draw a tow of dry fiber from a fiber reel toward a forming tool. The tow spreader manipulates the tow via the traction feed rollers, an acoustic element, and/or other mechanisms so as to form a thin strip similar to dry slit tape.

The resin dispenser includes a mixer, a heating component, and a nozzle for depositing preheated resin onto the forming tool. The resin dispenser may be positioned directly in front of the compaction roller.

The surface heater warms the tool and may be a laser heater, an infrared heater, convection component, or a radiant heat source. For example, the surface heater may be a hot air jet aimed at the forming tool directly in front of the resin deposition point.

The compaction roller is a large cylindrical barrel biased toward the forming tool via a pressure application cylinder, a spring, an actuator, or other similar biasing mechanism and is configured to move over the tow along the forming tool. The compaction roller includes an ultrasonic transducer or other suitable vibration mechanism for reciprocating or oscillating the compaction roller and a heating component for warming the compaction roller and preventing heat from being lost from the resin to the compaction roller.

The intermediate heater is positioned between the compaction roller and the transfer roller. The intermediate heater may be an infrared heater, convection component (e.g., hot air blower), or any other suitable heating element.

The transfer roller is a large cylindrical barrel biased toward the forming tool via a pressure application cylinder, a spring, an actuator, or other similar biasing mechanism and configured to follow the compaction roller over the tow along the forming tool. The transfer roller includes an ultrasonic transducer or other suitable vibration mechanism for reciprocating or oscillating the compaction roller and a heating component for warming the transfer roller and preventing heat from being lost from the resin to the transfer roller.

In use, the AFP and in-situ fiber impregnation system draws the dry fiber tow from the fiber supply toward the forming tool via the feeder and spreads the tow via the tow spreader. The tow may be inspected via a sensor or camera to ensure a proper thickness, width, uniformity, or other parameter as it is fed toward the forming tool.

Meanwhile, the resin dispenser mixes components of the resin together, preheats the resin, and applies a bead or layer of resin onto the forming tool at a resin deposition point directly in front of the compaction roller. The surface heater also warms the forming tool near the resin deposition point. This prevents the resin from losing heat to the forming tool.

The compaction roller moves over the tow along the forming tool as the resin is deposited such that the tow is compressed over the freshly deposited resin. The ultrasonic transducer or other vibration mechanism of the compaction roller reciprocates or oscillates the compaction roller, which aids in impregnating the resin into the tow. The heating component of the compaction roller also prevents the resin from losing heat to the compaction roller. The doctor blade collects and removes excess resin from the compaction roller.

The intermediate heater follows the compaction roller and heats the outermost filaments of the tow (the last filaments to be wetted by the resin) to ensure that the tow is thoroughly impregnated. The intermediate heater also helps maintain an elevated temperature of the tow and resin between the compaction roller and the transfer roller.

The transfer roller moves along the tow after the compaction roller and compresses the tow a second time to ensure that the tow is saturated. The ultrasonic transducer or other vibration mechanism of the transfer roller reciprocates or oscillates the transfer roller, which aids in saturating the tow. The heating component of the transfer roller also prevents heat loss from the resin to the transfer roller. The doctor blade of the transfer roller also removes excess resin from the transfer roller.

The impregnated and saturated tow may then be cured, pre-cured, or otherwise subsequently treated via a heat roller, a cooling air knife, or other device depending on the fiber and resin being used and the composite part being made. Once a fiber layer has been placed, a cutter may terminate the tow between the feeder and the compaction roller. The AFP and in-situ impregnation system may then reset to a starting point to place a subsequent layer on top of the previously placed layer.

The AFP and in-situ impregnation system may be a multi-stage wetting system in which the compaction roller and transfer roller are separate, as described above, or a single-stage wetting system in which the compaction roller and transfer roller are joined together or replaced by a belt or similar mechanism. For example, a relatively stiff centerless belt may be used for compaction and saturation. This eliminates the need for large rollers and allows the centerless belt to conform to complex forming tool contours.

The above-described AFP and in-situ fiber impregnation system provides several advantages. For example, the compaction roller moves over the tow along the forming tool, and the resin dispenser applies the resin in front of the compaction roller so that the tow is impregnated as it is pressed onto the forming tool. The resin dispenser applies the resin on the forming tool or the previously laid fiber layer and the tow is pressed onto the resin such that the resin impregnates the tow in a direction away from the forming tool. The compaction roller, transfer roller, and other components move along the forming tool (in unison or independently) so that the tow is spread, inspected, pressed onto the forming tool or previously laid fiber layer, impregnated with the resin, saturated, and cured or pre-cured in a continuous assembly line fashion.

Another embodiment of the invention is an AFP system broadly comprises a feeder, a tow spreader, a roller unit, a heater, and a cooling air knife. The AFP system may be used to lay fiber pre-impregnated with resin, as part of an in-situ fiber impregnation system, or as an automated tape laying (ATL) system.

The feeder may include opposing traction feed rollers, grippers, or other fiber metering mechanisms. The feeder pulls a tow of fiber from a fiber reel or other fiber supply through the tow spreader toward a forming tool.

The tow spreader may include a number of alternating rollers configured to manipulate the tow into a thin strip. The tow spreader spreads the tow to form a thin strip of fiber.

The roller unit includes a centerless belt, a number of belt controllers, a number of idler rollers, and a number of vibrators. The roller unit may be guided or pressed downward via a manipulator.

The centerless belt is a relatively stiff band configured to substantially maintain a rolling shape over the tool. That is, the centerless belt is not supported on or restricted by primary rollers but instead is supported by its own rigidity. The centerless belt may be divided into a number of lateral sections that can progress at different speeds and are independently conformable relative to each other. The centerless belt may be vibrated via the vibrators, ultrasonic transducers, or similar vibration mechanisms.

The belt controllers may be small cylindrical rollers positioned near a top section and on alternating sides of the centerless belt. The belt controllers may be divided into a number of lateral sections corresponding to the lateral sections of the centerless belt.

The idler rollers are disposed near a bottom portion of the centerless belt. The idler rollers apply intermittent pressure to the centerless belt and hence the tow to promote complete compaction.

The vibrators reciprocate or oscillate to vibrate some of the belt controllers and/or some of the idler rollers, thus creating compression waves that pass through the centerless belt to the tow. This may cause directional vibrations such as axial vibrations in the centerless belt, which translates into both compressive vibrations and shear vibrations in the tow. Alternatively, an ultrasonic transducers or other vibration mechanisms may be used.

The heater is positioned near a downward-turning portion of the centerless belt to warm the centerless belt, the forming tool, and/or the previously laid fiber layer so that heat is not lost from resin in the tow to the forming tool and/or the previously laid fiber layer. This improves surface wetting characteristics of the resin.

The cooling air knife is positioned in the area encircled by the centerless belt and directs relatively cooler air towards the compressed tow. The cool clean air chills the tow to a lower temperature such that viscosity of the resin in the tow is increased to prevent flow until the next layer is added.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 6 is a front elevation view of a roller unit of the AFP system of FIG. 5.

Figure 1:
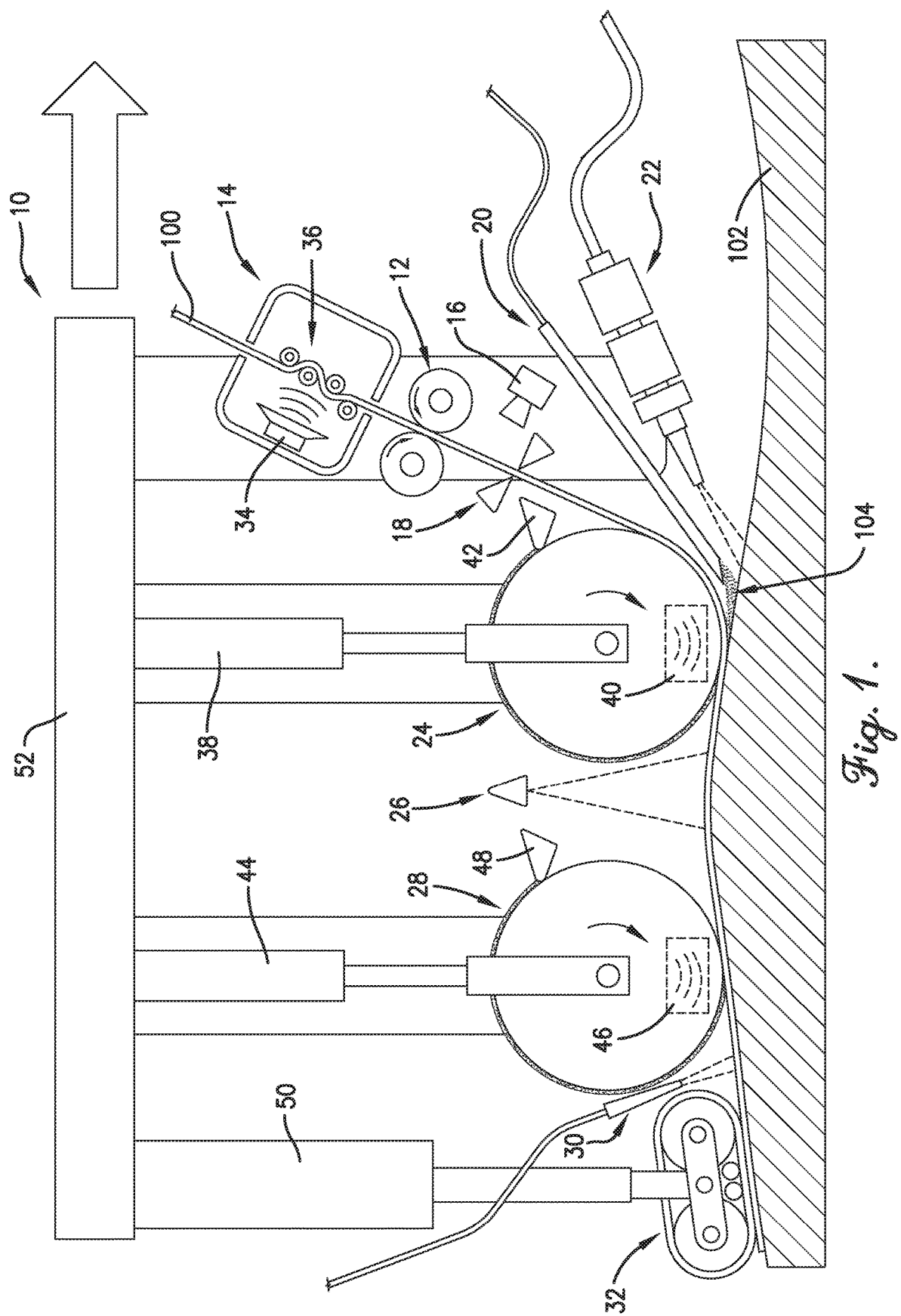
FIG. 1 is a side elevation view of an AFP and in-situ fiber impregnation system constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
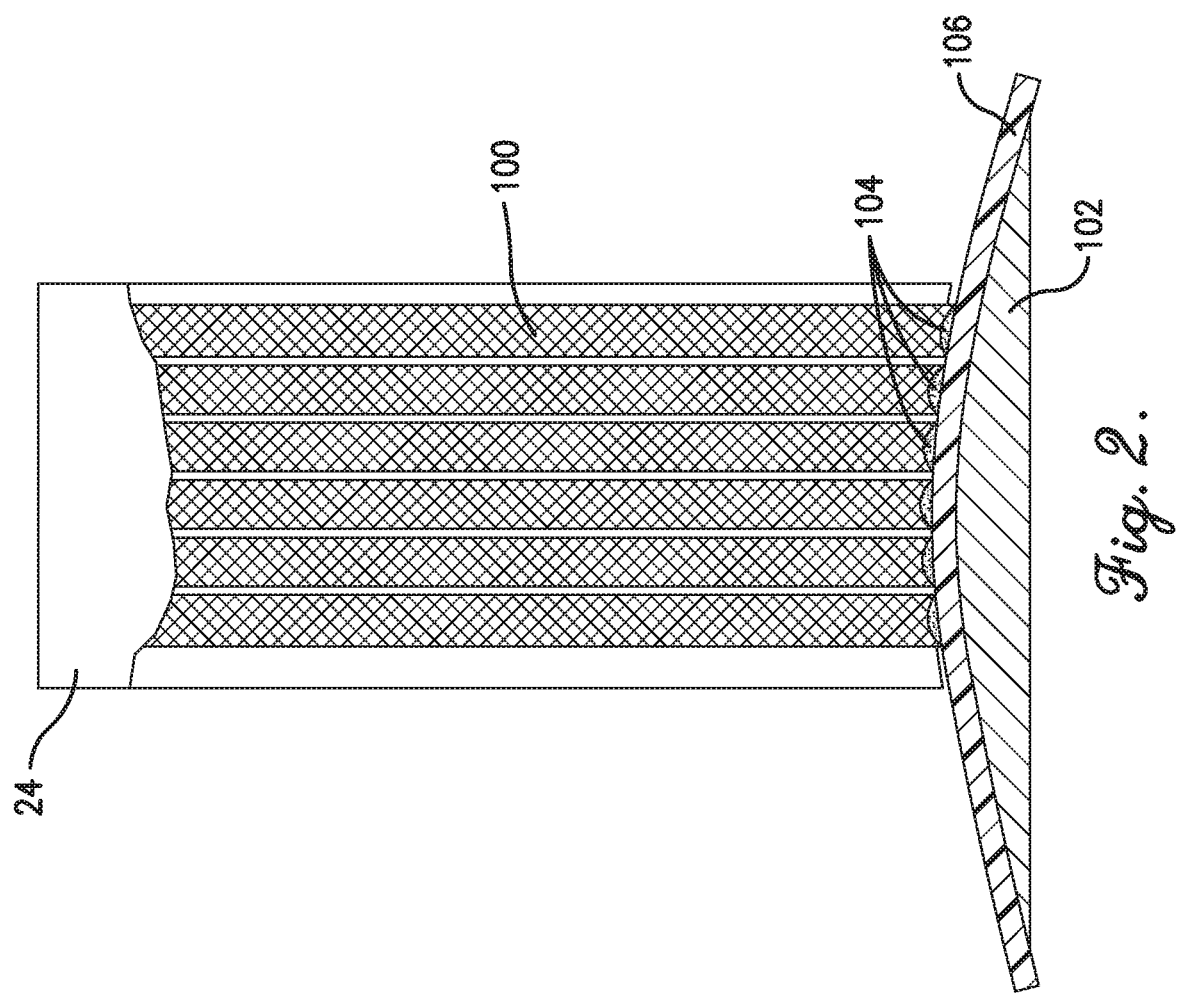
FIG. 2 is a front elevation view of a compaction roller of the AFP and in-situ fiber impregnation system of FIG. 1.

Turning to FIGS. 1 and 2, an automated fiber placement (AFP) and in-situ fiber impregnation system 10 constructed in accordance with an embodiment of the invention is illustrated. The AFP and in-situ fiber impregnation system 10 broadly comprises a feeder 12, a tow spreader 14, an inspection sensor 16, a cutter 18, a resin dispenser 20, a surface heater 22, a compaction roller 24, an intermediate heater 26, a transfer roller 28, a cooling air knife 30, and a heat roller 32.

The feeder 12 pulls a tow 100 of fiber from a fiber reel or other fiber supply through the tow spreader 14 toward a forming tool 102 and may include opposing traction feed rollers, grippers, or other fiber metering mechanisms. The feeder 12 may be controlled automatically so as to start, stop, and increase or decrease feeding speed according to tow tension, geometry of the forming tool, desired part geometry, and other factors.

The tow spreader 14 spreads the tow 100 to form a thin strip of fiber and may including an acoustic element 34 for acoustically spreading the tow. The tow spreader 14 may also include a number of alternating rollers 36 configured to manipulate the tow 100 into a thin strip. In one embodiment, the tow spreader 14 is positioned before the feeder 12 so that the feeder 12 pulls the tow 100 through the tow spreader 14.

The inspection sensor 16 detects a width of the tow 100 after it has been spread by the tow spreader 14 and may be a camera, a profilometer, or any other suitable sensor. Alternatively, the inspection sensor 16 may detect imperfections, inconsistencies, tears, tension, or any other suitable parameter. The inspection sensor 16 may be communicatively coupled to a controller configured to operate the feeder 12 based on feedback from the inspection sensor 16. For example, the controller may increase a feeding speed of the feeder 12 to reduce tension in the tow 100 between the feeder 12 and the compaction roller 24.

The cutter 18 shears the tow 100 and may include opposing blades, clippers, or other suitable cutting edges. The cutter 18 may be positioned between the compaction roller 24 and the feeder 12 so that the feeder 12 retains engagement with fiber from the supply.

The resin dispenser 20 prepares resin and deposits it onto the forming tool 102 and may include a nozzle or outlet positioned directly in front of the compaction roller 24. The resin dispenser 20 may also include a mixer (e.g., a static mixer) for mixing components of the resin and a heater for preheating the resin.

The surface heater 22 warms the tool 102 and/or the previously laid fiber layer and may be a laser heater, an infrared heater, convection component, or a radiant heat source. For example, the surface heater 22 may be a hot air jet aimed at the forming tool 102 directly in front of the resin deposition point.

The compaction roller 24 moves over the tow 100 along the forming tool 102 and may be a rigid or pneumatic cylindrical barrel, a disc, a belt, or the like configured to rotate about a horizontally extending axis perpendicular to the compaction roller's direction of travel. The compaction roller 24 may be mounted to a pressure application cylinder 38, a spring, an actuator, or other suitable biasing mechanism for applying a downward force on the tow 100. The compaction roller 24 may also include an ultrasonic transducer 40 or other suitable vibration mechanism for reciprocating or oscillating the compaction roller 24, a doctor blade 42 including a sump and drain or auger for removing excess resin from the barrel, and a heating component for warming the compaction roller. The heating component may be a resistive element, a convection component (e.g., hot air blower), or the like.

The intermediate heater 26 is positioned between the compaction roller 24 and the transfer roller 28 and warms the tow 100 and resin 104 after initial compaction. The intermediate heater 26 may be an infrared heater, convection component (e.g., hot air blower), or any other suitable heating means.

The transfer roller 28 moves over the tow 100 along the forming tool 102 behind the compaction roller 24 and may be a rigid or pneumatic cylindrical barrel, a disc, a belt, or the like configured to rotate about a horizontally extending axis perpendicular to the transfer roller's direction of travel. The transfer roller 28 may be mounted to a pressure application cylinder 44, a spring, an actuator, or other suitable biasing mechanism for applying a downward force on the tow 100. The transfer roller 28 may also include an ultrasonic transducer 46 or other suitable vibration mechanism for reciprocating or oscillating the transfer roller 28, a doctor blade 48 including a sump and drain or auger for removing excess resin from the barrel, and a heating component for warming the transfer roller 28. The heating component may be a resistive element, a convection component (e.g., hot air blower), or the like. The transfer roller 28 is spaced behind the compaction roller 24, thus forming a multi-stage wetting assembly.

The cooling air knife 30, particularly suitable for thermoplastic resins, cools the tow 100 and may be positioned directly behind the transfer roller 28. The cooling air knife 30 may emit cooled air or may cool the tow 100 via convection only.

The heat roller 32 presses against the tow 100 behind the transfer roller 28 and may include heated cylindrical barrels configured to rotate about horizontally extending axes perpendicular to the heat roller's direction of travel. In one embodiment, the heat roller 32 includes a belt passing over a number of cylindrical rollers and idler rollers. The heat roller 32 may be mounted to a pressure application cylinder 50, a spring, an actuator, or other suitable biasing mechanism for applying a downward force on the tow 100.

In one embodiment, the above components are mounted on or attached to a mechanical head 52 configured to move them in unison in the direction of travel to maintain their relative spacing. Alternatively, the above components may be independently disposed and actuated. The mechanical head 52 may include a number of parallel feeders, rollers, and other components for covering more area in a single pass or for forming complex geometry parts.

The AFP and in-situ fiber impregnation system 10 operates as follows. First, the feeder 12 pulls dry fiber from a fiber supply through the tow spreader 14 to form a thin strip of fiber material (i.e., the tow 100). In one embodiment, the acoustic element 34 spreads the dry fiber as it passes alternating rollers 36.

The inspection sensor 16 then interrogates the tow 100 to determine its width and/or other parameters of the tow 100. The inspection sensor 16 may transmit a signal representative of the tow's width to a controller which in turn adjusts a parameter of the acoustic element 34 of the tow spreader 14 to bring the tow's width within a predetermined range.

The surface heater 22 warms the forming tool 102 and/or the previously laid fiber layer near the resin deposition point so that heat is not lost from the resin 104 to the forming tool 102 and/or the previously laid fiber layer. This improves surface wetting characteristics of the resin 104.

The resin dispenser 20 applies a heated uncured/melted bead of resin 104 onto the forming tool 102 or the previously laid fiber layer at the resin deposition point (directly in front of the compaction roller 24). To that end, the resin dispenser 20 may preheat the resin 104 to improve its surface wetting characteristics.

The compaction roller 24 then presses the tow 100 into the resin 104 such that the resin 104 impregnates the tow 100 in a direction away from the forming tool 102. The ultrasonic transducer 40 may reciprocate or oscillate the compaction roller 24 to improve the impregnation. The heater of the compaction roller 24 may also prevent heat loss from the resin 104 to the compaction roller 24. Meanwhile, the doctor blade 42 removes excess resin accumulated on the compaction roller 24.

The intermediate heater 26 follows behind the compaction roller 24 and directs heat to the impregnated tow 100. Specifically, the intermediate heater 26 may only heat outermost filaments of the impregnated tow 100 since they are the last filaments to be wetted and thus may need supplemental heat as the compaction roller 24 moves past the resin deposition point.

The transfer roller 28 follows the compaction roller 24 and the intermediate heater 26 to ensure that resin completely impregnates (i.e., saturates) the tow 100. The ultrasonic transducer 46 may reciprocate or oscillate the transfer roller 28 to improve saturation. The heater of the transfer roller 28 may also prevent heat loss from the resin 104 to the transfer roller 28. Meanwhile, the doctor blade 48 removes excess resin accumulated on the transfer roller 28.

The cooling air knife 30 follows the transfer roller 28 and directs relatively cooler air towards the saturated tow 100. The cool clean air chills the tow 100 to a lower temperature such that viscosity of the resin 104 is increased to prevent flow until the next layer is added. The cooling air knife 30 may only be used for certain thermoplastic resins.

The heat roller 32 follows the transfer roller 28 in some embodiments and applies additional heat to the saturated tow 100 to partially cure the resin 104 at selected layers, thus avoiding the need for consolidation at a later stage. The heat roller 32 may supply heat at an elevated temperature to sufficiently advance a resin cure state.

The specific curing component (e.g., cooling air knife 30, heat roller 32) that is employed depends on the type of resin used, the type of part being made, and other factors. If elevated temperatures are required to sufficiently advance the resin cure state, the transfer roller 28 is followed by the heat roller 32 to partially cure the resin 104 at selected layers, thus avoiding the need for consolidation at a later stage. In the case of thermoplastic resin, the heat roller 32 may not be necessary. Some resin curatives could be used to eliminate the use of the heat roller 32 since they can cure substantially at room temperature. Thermoplastic resins can reach full strength simply by cooling via the cooling air knife 30 or after a sufficient length of time (thus eliminating the need for a post-cure oven or bagging operation typically used with thermoplastic resins). Either by application of the heat roller 32 or by selecting a sufficiently reactive resin curative, a thermosetting resin may be sufficiently cured such that it does not reflow (thus enabling a post cure without the need for a vacuum bag typically used with thermosetting resins). The thermosetting resin may also be sufficiently set to be freestanding without support from the forming tool 102 or pressure from an autoclave or atmosphere. For layers that are not to be pre-cured with the transfer roller 28, the cooling air knife 30 may be used as described above.

The cutter 18 then shears the tow 100 once the AFP and in-situ fiber impregnation system 10 reaches the end of the tool 102 or the end of a placement path. The remainder of the tow 100 is pressed, impregnated and saturated with resin 104, and cured. The AFP and in-situ fiber impregnation system 10 is then reset to lay another layer of fiber over the tow 100.

The above-described AFP and in-situ fiber impregnation system 10 provides several advantages. For example, the compaction roller 24 moves over the tow 100 along the forming tool 102 and the resin dispenser 20 applies the resin 104 directly in front of the compaction roller 24 so that the tow 100 is impregnated as it is pressed onto the forming tool 102, which eliminates the need for separate pre-impregnation, tape slitting, refrigerated shipping and storing, preparation, and handling steps. This resin dispenser 20 applies the resin 104 on the forming tool 102 or the previously laid fiber layer and the tow 100 is pressed onto the resin 104 such that the resin 104 impregnates the tow 100 in a direction away from the forming tool 102, which prevents porosity and voids. The compaction roller 24, transfer roller 28, and other components move along the forming tool 102 (in unison or independently) so that the tow 100 is spread, inspected, pressed onto the forming tool 102 or previously laid fiber layer, impregnated with the resin 104, saturated, and cured or pre-cured in a continuous assembly line fashion.

The AFP and in-situ fiber impregnation system 10 also increases out-life indefinitely (i.e., eliminates material expiration) and eliminates bagging unless the bag side requires mold control cauls. The AFP and in-situ fiber impregnation system 10 also enables free-standing postcure, reduces cure time, eliminates autoclave and oven composite processes (OoAaO), and has a low temperature tooling, thus eliminating the need for CTE matching.

The above-described invention allows lowest cost materials to be used. For example, the tow 100 may be carbon tow such as Hexcel AS4C-6K Carbon Fiber Tow 4 lb creel or any other suitable low cost fiber material. The resin 104 may be Barton brand solvents such as Epon 828/curing agent W or any other suitable low cost resin. The composite may be 75% fiber and 25% resin by weight. The tow 100 is impregnated and sheared in-situ, thus eliminating the costs of pre-impregnated and slitted tape.

Figure 3:
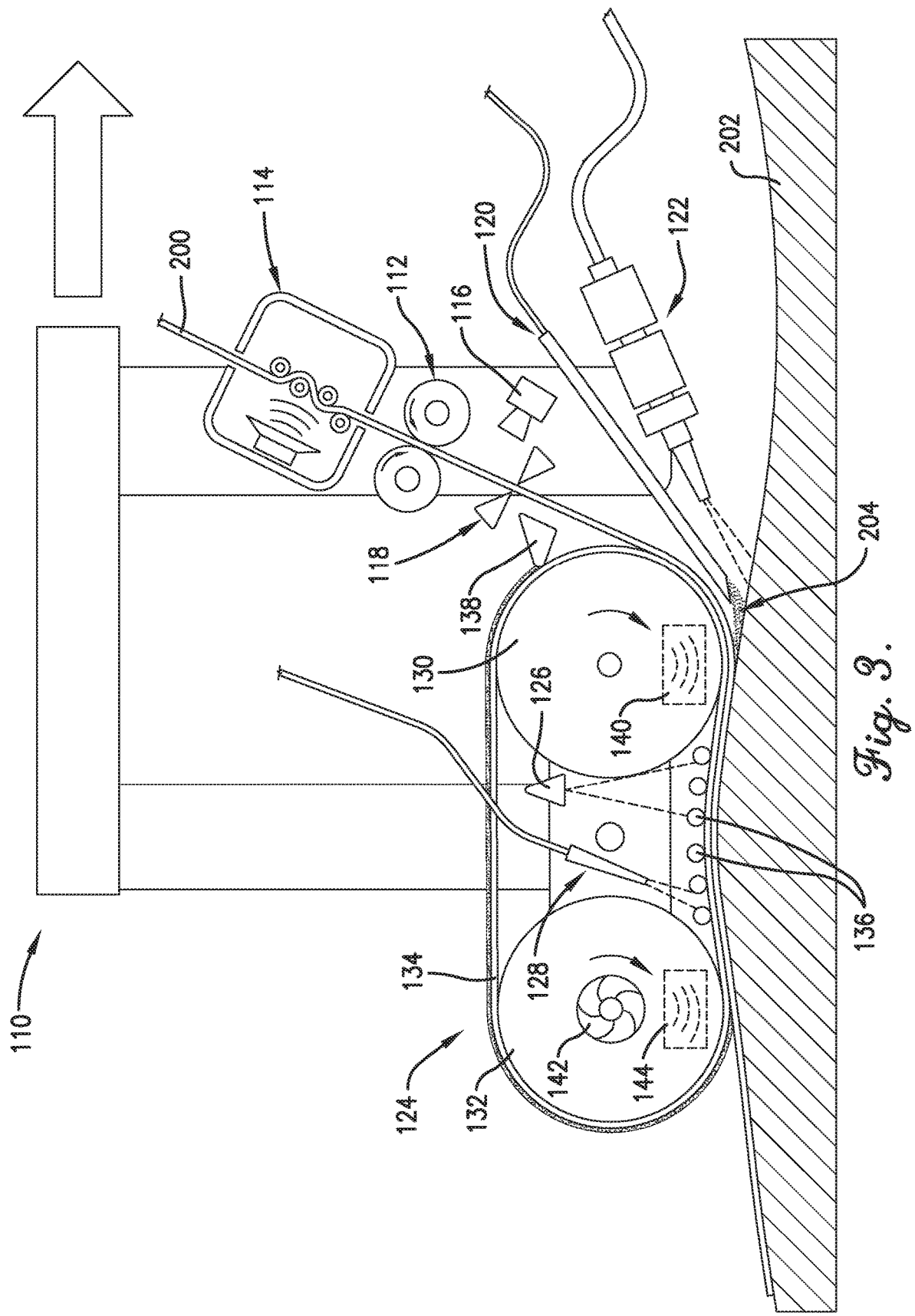
FIG. 3 is a side elevation view of an AFP and in-situ fiber impregnation system constructed in accordance with another embodiment of the invention.

Turning to FIG. 3, an AFP and in-situ fiber impregnation system 110 constructed in accordance with another embodiment of the invention is illustrated. The AFP and in-situ fiber impregnation system 110 broadly comprises a feeder 112, a tow spreader 114, an inspection sensor 116, a cutter 118, a resin dispenser 120, a surface heater 122, a roller unit 124, an intermediate heater 126, and a cooling air knife 128. The feeder 112, tow spreader 114, inspection sensor 116, cutter 118, resin dispenser 120, surface heater 122, intermediate heater 126, and cooling air knife 128 are substantially similar to the components described above and thus will not be described further.

The roller unit 124 includes a compaction roller 130, a transfer roller 132, a belt 134, a number of idler rollers 136, and a doctor blade 138 including a sump and drain or auger. The roller unit 124 forms a single-stage wetting setup in contrast to the separate compaction roller 24 and transfer roller 28 of the above embodiment, which can be considered a multi-stage wetting setup.

The compaction roller 130 moves over the tow 200 along the forming tool 202 and may be a cylindrical barrel configured to rotate about a horizontally extending axis perpendicular to the compaction roller's direction of travel. The compaction roller 130 may include an ultrasonic transducer 140 or other suitable vibration mechanism for reciprocating or oscillating the compaction roller 130 and a heating component for warming the compaction roller 130. The heating component may be a resistive element, a convection component (e.g., hot air blower), or the like.

The transfer roller 132 moves over the tow 200 along the forming tool 202 behind the compaction roller 130 and may be a cylindrical barrel configured to rotate about a horizontally extending axis perpendicular to the transfer roller's direction of travel. The transfer roller 132 may include a radial spring 142 for twisting the belt 134, an ultrasonic transducer 144 or other suitable vibration mechanism for reciprocating or oscillating the transfer roller 132, and a heating component for warming the transfer roller 132. The heating component may be a resistive element, a convection component (e.g., hot air blower), or the like.

The belt 134 is seated over the compaction roller 130 and the transfer roller 132 for maintaining compression on the tow 200 between the compaction roller 130 and the transfer roller 132. The belt 134 may be a thin metal, polymer, or composite band having a hardened and/or self-releasing coating. The belt 134 may be heated via the compaction roller 130, the transfer roller 132, the intermediate heater 126, and/or another means of heat transfer to a temperature that keeps the resin's viscosity at a level sufficient to wet the tow 200 and maintain compaction of the tow 200. More specifically, the belt 134 releases heat directly to the resin 204 and to air impinging against the inside surface of the belt 134.

The idler rollers 136 are disposed between the compaction roller 130 and the transfer roller 132 near a bottom segment of the belt 134 and apply intermittent pressure to the tow 200 to promote complete wet-out and compaction. The idler rollers 136 may be mounted on bogies or independent suspensions.

The doctor blade 138 removes excess resin from the belt 134. To that end, the doctor blade 138 may be positioned adjacent the compaction roller 130 or the transfer roller 132.

The roller unit 124 compresses the tow 200 and impregnates and saturates it with resin 204 in a single stage. That is, the compaction roller 130 presses the tow 200 toward the forming tool 202 into the resin 204 via the belt 134 such that the resin 204 impregnates the tow 200 in a direction away from the forming tool 202. The belt 134 continues to apply heat and pressure to the tow 200 via the idler rollers once the compaction roller 130 has passed the resin deposition point. The transfer roller 132 applies additional pressure to the tow 200 via the belt 134 to ensure that the tow 200 is saturated with resin 204, after which point the pressure of the belt 134 is released due to the belt's continuous movement. After the transfer roller 132 has passed, the resin 204 cures or is cooled sufficiently to maintain its compaction until it is either covered by subsequent layers or post layup processing.

Figure 4:
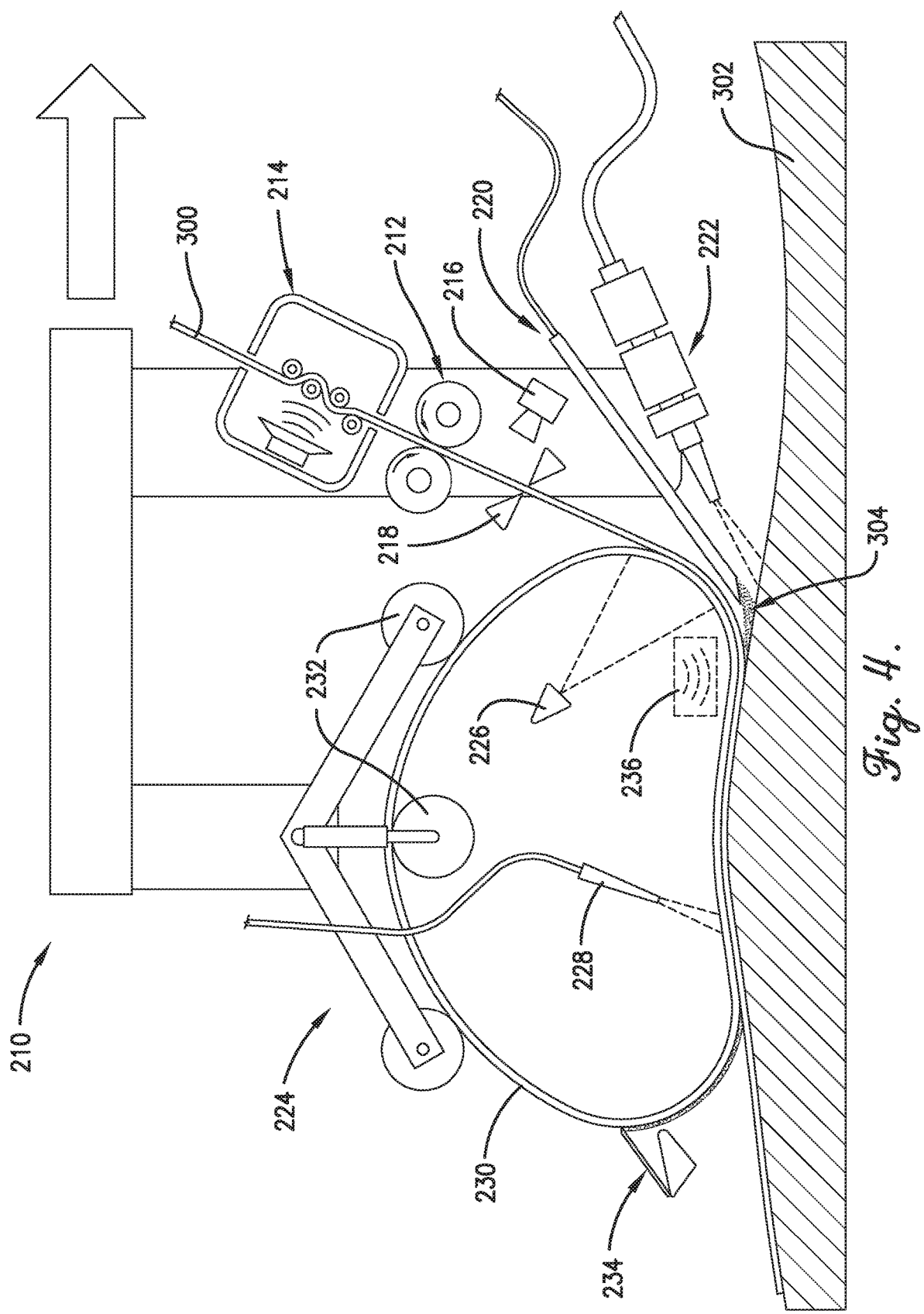
FIG. 4 is a side elevation view of an AFP and in-situ fiber impregnation system constructed in accordance with another embodiment of the invention.

Turning to FIG. 4, an AFP and in-situ fiber impregnation system 210 constructed in accordance with an embodiment of the invention is illustrated. The AFP and in-situ fiber impregnation system 210 broadly comprises a feeder 212, a tow spreader 214, an inspection sensor 216, a cutter 218, a resin dispenser 220, a surface heater 222, a roller unit 224, an intermediate heater 226, and a cooling air knife 228. The feeder 212, tow spreader 214, inspection sensor 216, cutter 218, resin dispenser 220, surface heater 222, intermediate heater 226, and cooling air knife 228 are substantially similar to the components described above and thus will not be described further.

The roller unit 224 includes a centerless belt 230, a number of belt controllers 232, and a doctor blade 234 including a sump and drain or auger. The roller unit 224 forms a single-stage wetting setup similar to the single-stage wetting setup described above except for the use of centerless belt 230, which does not require a compaction roller, a transfer roller, and idler rollers.

The centerless belt 230 is a relatively stiff band configured to substantially maintain a rolling shape over the tool 300. That is, the centerless belt 230 is not supported on or restricted by primary rollers but instead is supported by its own rigidity. The centerless belt 230 is deformable yet resists deformation so that the centerless belt 230 applies pressure to a tow of fiber when the centerless belt 230 is deformed. The centerless belt 230 may be vibrated via an ultrasonic transducer 236 or similar vibration mechanism.

The belt controllers 232 guide the centerless belt 230 and may be small cylindrical rollers positioned near a top section and on alternating sides of the centerless belt 230. The belt controllers 232 may be mounted on a pivotable or movable bogie to maintain relative spacing therebetween while allowing for a degree of freedom of the belt controllers 232.

The doctor blade 234 removes excess resin from the centerless belt 230. To that end, the doctor blade 234 may be positioned adjacent to a leading section or a trailing section of the centerless belt 230.

The roller unit 224 compresses the tow 300 and impregnates and saturates it with resin 304 in a single stage. That is, the centerless belt 230 presses the tow 300 toward the forming tool 302 into the resin 304 such that the resin 304 impregnates the tow 300 in a direction away from the forming tool 302. The centerless belt 230 continues to apply heat and pressure to the tow 300 as it rolls over the tow 300 to ensure that the tow 300 is saturated with resin 304, after which point the pressure of the centerless belt 230 is released due to the centerless belt's continuous movement. After the centerless belt 230 has passed, the resin 304 cures or is cooled to maintain compaction, after which the tow 300 is either covered by subsequent layers or post layup processing is initiated.

In this embodiment, the space encircled by the centerless belt 230 can be used for heating and vibration means (e.g., ultrasonic transducer 236). The centerless belt 230 does not require rollers having a large thermal mass, thus simplifying heat management near the deposited resin 304. The centerless belt 230 also simplifies construction since the centerless belt 26 can conform to the tool's shape without the need for a radial spring or flexible axle. A number of centerless belts can also be mounted side-by-side since central axles are not needed. The centerless belt 230 can conform locally not only in the vertical direction but also in a twisting action, which allows it to conform to a complex compound forming tool curvature.

Figure 5:
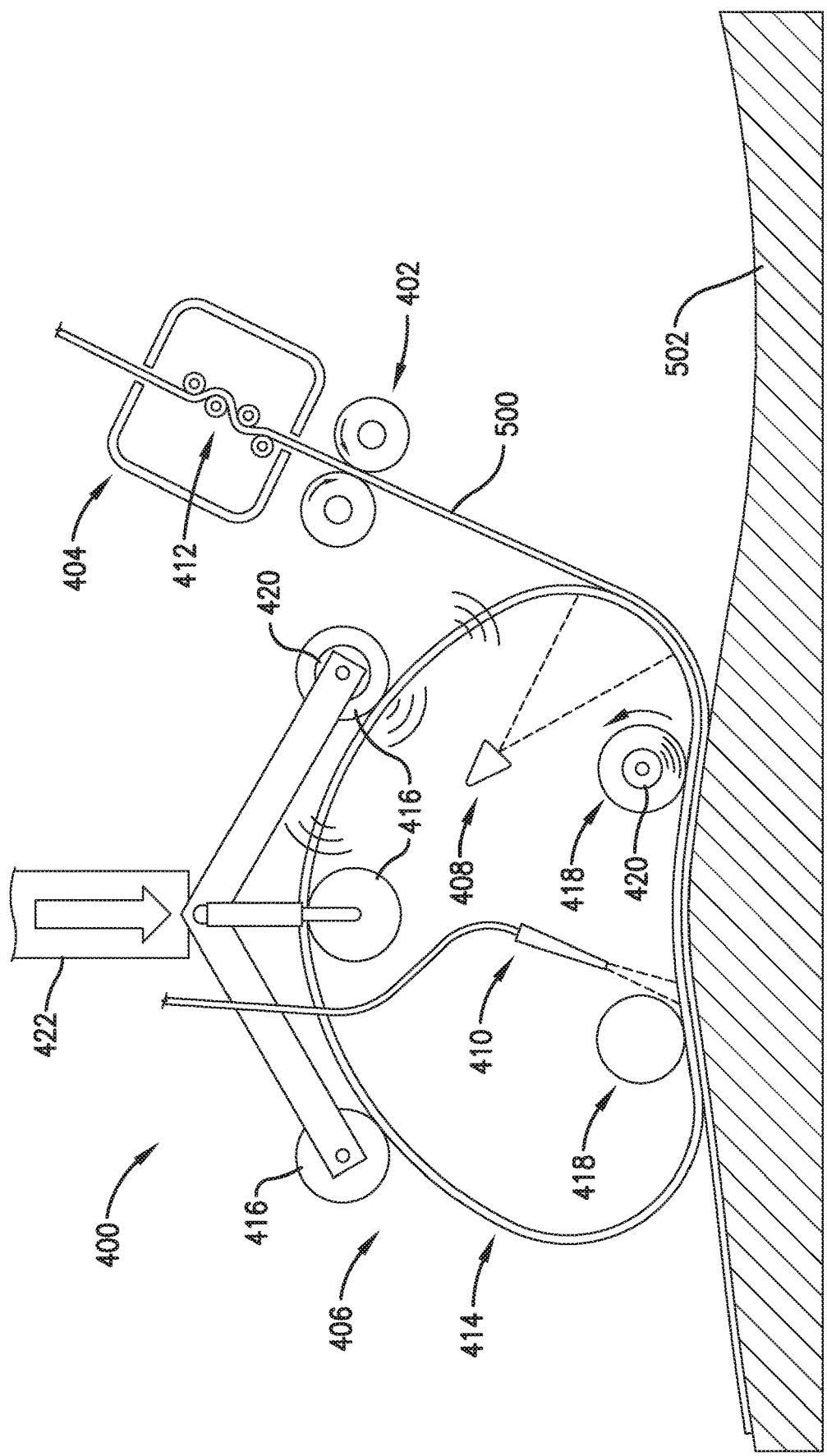
FIG. 5 is a side elevation view of an AFP system constructed in accordance with another embodiment of the invention.

Turning to FIGS. 5 and 6, an automated fiber placement system 400 constructed in accordance with another embodiment of the invention is illustrated. The automated fiber placement system 400 broadly comprises a feeder 402, a tow spreader 404, a roller unit 406, a heater 408, and a cooling air knife 410.

The feeder 402 pulls a tow 500 of fiber from a fiber reel or other fiber supply through the tow spreader 404 toward a forming tool 502 and may include opposing traction feed rollers, grippers, or other fiber metering mechanisms. The feeder 402 may be controlled automatically so as to start, stop, and increase or decrease feeding speed according to tow tension, geometry of the forming tool, desired part geometry, and other factors.

The tow spreader 404 spreads the tow 500 to form a thin strip of fiber. The tow spreader 404 may also include a number of alternating rollers 412 configured to manipulate the tow 500 into a thin strip. In one embodiment, the tow spreader 404 is positioned before the feeder 402 so that the feeder 402 pulls the tow 500 through the tow spreader 404.

The roller unit 406 includes a centerless belt 414, a plurality of belt controllers 416, a plurality of idler rollers 418, and a plurality of vibrators 420. The roller unit 406 may be guided or pressed downward via a manipulator 422.

The centerless belt 414 is a relatively stiff band configured to substantially maintain a rolling shape over the tool 502. That is, the centerless belt 414 is not supported on or restricted by primary rollers but instead is supported by its own rigidity. The centerless belt 414 is deformable yet resists deformation so that the centerless belt 414 applies pressure to a tow 500 when the centerless belt 414 is deformed. The centerless belt 414 may be vibrated via the vibrators 420, ultrasonic transducers, or similar vibration mechanisms.

In one embodiment, the centerless belt 414 is divided into a plurality of lateral sections 424. The lateral sections 424 may progress at different speeds and may be independently conformable relative to each other.

The belt controllers 416 guide the centerless belt 414 and may be small cylindrical rollers positioned near a top section and on alternating sides of the centerless belt 414. The belt controllers 416 may be mounted on a pivotable or movable bogie to maintain relative spacing therebetween while allowing for a degree of freedom of the belt controllers 414.

In one embodiment, the belt controllers 416 are divided into a plurality of lateral sections 426 corresponding to the lateral sections 424 of the centerless belt 414. The lateral sections 424 may drive or guide the corresponding lateral sections 424 of the centerless belt 414 at different speeds relative to each other to accommodate the independent conformability of the corresponding lateral sections 424 of the centerless belt 414.

The idler rollers 418 may be disposed near a bottom portion of the centerless belt 414. The idler rollers 418 apply intermittent pressure to the centerless belt 414 and hence the tow 500 to promote complete compaction. The idler rollers 418 may be mounted on bogies or independent suspensions.

The vibrators 420 reciprocate or oscillate to vibrate some of the belt controllers 416 and/or some of the idler rollers 418, thus creating compression waves that pass through the centerless belt 414 to the tow 500. This may cause directional vibrations such as axial vibrations in the centerless belt 414, which translates into both compressive vibrations and shear vibrations in the tow 500. Alternatively, an ultrasonic transducers or other vibration mechanisms may be used.

The manipulator 422 exerts a downward force on the belt controllers 416 to deform the centerless belt 414 when the manipulator 422 moves the belt controllers 416 toward the forming tool 502. The manipulator 422 may be an actuator, robot arm, linkage system, or the like.

The heater 408 warms the centerless belt 414, the forming tool 502 and/or the previously laid fiber layer so that heat is not lost from resin in the tow 500 to the forming tool 502 and/or the previously laid fiber layer. This improves surface wetting characteristics of the resin.

The cooling air knife 410 is positioned in the area encircled by the centerless belt 414 and directs relatively cooler air towards the compressed tow 500. The cool clean air chills the tow 500 to a lower temperature such that viscosity of the resin in the tow 500 is increased to prevent flow until the next layer is added. The cooling air knife 410 may only be used for certain thermoplastic resins.

The above-described AFP system 400 provides several advantages. For example, the centerless belt 414 of the roller unit 406 can be used with tows of fiber pre-impregnated with resin, as part of an in-situ fiber impregnation system, with slit tape, and with full width tape implemented in automated tape laying (ATL). The centerless belt 414 can be vibrated such that compressive and shear vibration waves pass through the centerless belt 414 into tows of fiber being laid on a forming tool. The centerless belt 414 can be laterally segmented, with each segment being configured to progress at different speeds and conform independently to the tows of fiber.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A roller unit for an automated fiber placement system for placing a tow of fibers onto a forming tool, the roller unit comprising:
   a plurality of belt controllers;
   a manipulator configured to move the plurality of belt controllers; and
   a centerless belt being positioned on the plurality of belt controllers, the centerless belt being configured to move over the tow of fibers along the forming tool to press the tow of fibers onto the forming tool, the plurality of belt controllers being configured to deform the centerless belt when the manipulator moves the belt controllers toward the forming tool.

2. The roller unit of claim 1, the centerless belt being divided into lateral segments for lateral conformance of the centerless belt to the forming tool.

3. The roller unit of claim 2, the lateral segments being configured to cycle at different speeds from each other.

4. The roller unit of claim 2, wherein the plurality of belt controllers are divided into lateral segments corresponding to the lateral segments of the centerless belt.

5. The roller unit of claim 1, the tow of fibers being slit tape, the centerless belt being configured to press the slit tape onto the forming tool.

6. The roller unit of claim 1, the tow of fibers being full width tape, the centerless belt being configured to press the full width tape onto the forming tool.

7. The roller unit of claim 1, further comprising an idler roller configured to transmit compression waves through the centerless belt to the tow of fibers via vibrations.

8. The roller unit of claim 1, further comprising an idler roller configured to axially vibrate the centerless belt to transmit shear waves into the tow of fibers.

9. The roller unit of claim 1, wherein the tow of fibers is pre-impregnated with resin and the centerless belt is configured to compact the tow of fibers including the resin.

10. The roller unit of claim 1, wherein the centerless belt is deformable yet resists deformation such that the centerless belt applies pressure to the tow of fibers when the centerless belt is deformed.

11. An automated fiber placement system for placing a tow of fibers pre-impregnated with resin onto a forming tool, the automated fiber placement system comprising:
a feeder configured to feed the tow of fibers toward the forming tool; and
a roller unit including a centerless belt, a plurality of belt controllers, and a doctor blade, the centerless belt being configured to move over the tow of fibers along the forming tool to compact the tow of fibers including the resin onto the forming tool.

12. The automated fiber placement system of claim 11, the centerless belt being divided into lateral segments for lateral conformance of the centerless belt to the forming tool.

13. The automated fiber placement system of claim 12, the lateral segments being configured to cycle at different speeds from each other.

14. The automated fiber placement system of claim 12, the plurality of belt controllers being divided into lateral segments corresponding to the lateral segments of the centerless belt.

15. The automated fiber placement system of claim 11, the tow of fibers being slit tape, the centerless belt being configured to press the slit tape onto the forming tool.

16. The automated fiber placement system of claim 11, the tow of fibers being full width tape, the feeder being configured to feed the full width tape from a full width tape roll, the centerless belt being configured to press the full width tape onto the forming tool.

17. The automated fiber placement system of claim 11, further comprising an idler roller configured to transmit compression waves through the centerless belt to the tow of fibers via vibrations.

18. The automated fiber placement system of claim 11, further comprising an idler roller configured to axially vibrate the centerless belt to transmit compression waves and shear waves into the tow of fibers.

19. The automated fiber placement system of claim 11, further comprising a heater configured to heat a section of the centerless belt before the section compresses the tow of fibers onto the forming tool.

20. An automated fiber placement system for placing a tow of fibers pre-impregnated with resin onto a forming tool, the automated fiber placement system comprising:
a feeder configured to feed the tow of fibers toward the forming tool;
a roller unit including:
a centerless belt divided into lateral segments for lateral conformance of the centerless belt to the forming tool, the centerless belt configured to move over the tow of fibers along the forming tool to compact the tow of fibers including the resin onto the forming tool;
a plurality of belt controllers divided into lateral segments corresponding to the lateral segments of the centerless belt, the plurality of belt controllers being configured to guide the centerless belt;
a doctor blade configured to remove excess resin from the centerless belt; and
an idler roller configured to transmit compression waves through the centerless belt to the tow of fibers via vibrations; and
a heater configured to heat a section of the centerless belt before the section compresses a portion of the tow of fibers onto the forming tool.

21. A method of automated fiber placement, the method comprising steps of:
moving a centerless belt positioned on a plurality of belt controllers toward a forming tool via a manipulator;
moving the centerless belt over a tow of fibers along the forming tool;
pressing the tow of fibers onto the forming tool via the centerless belt; and
deforming the centerless belt via the plurality of belt controllers so the tow of fibers conforms to the forming tool.

22. The method of claim 21, the centerless belt being divided into lateral segments, the method further comprising a step of laterally conforming the lateral segments, and hence the tow of fibers, to the forming tool.

23. The method of claim 22, further comprising a step of cycling the lateral segments of the centerless belt at different speeds from each other.

24. The method of claim 21, further comprising a step of transmitting compression waves through the centerless belt to the tow of fibers via vibrations via an idler roller.

25. The method of claim 21, further comprising a step of transmitting shear waves through the centerless belt to the tow of fibers via an idler roller.

26. The method of claim 21, further comprising steps of pre-impregnating the tow of fibers with resin and compacting the tow of fibers including the resin.

* * * * *